July 13, 1937.  E. W. DAVIS  2,087,085
LUBRICATING APPARATUS
Filed April 8, 1936
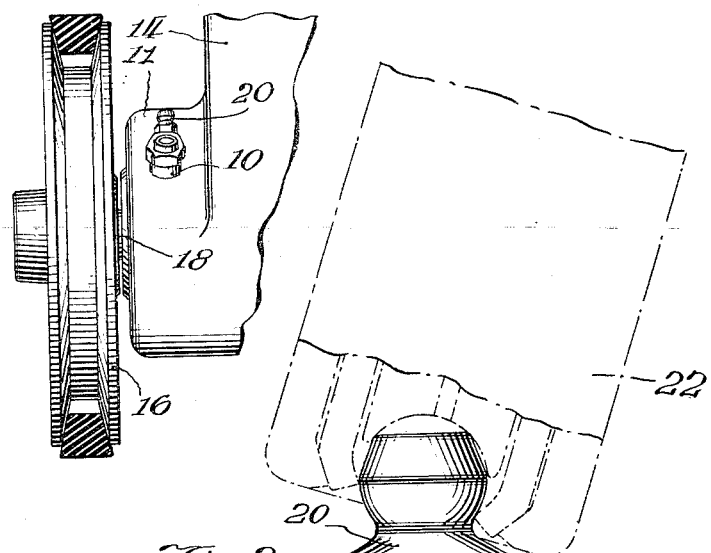
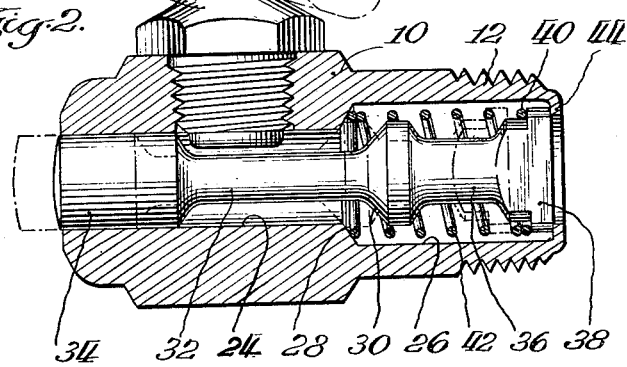
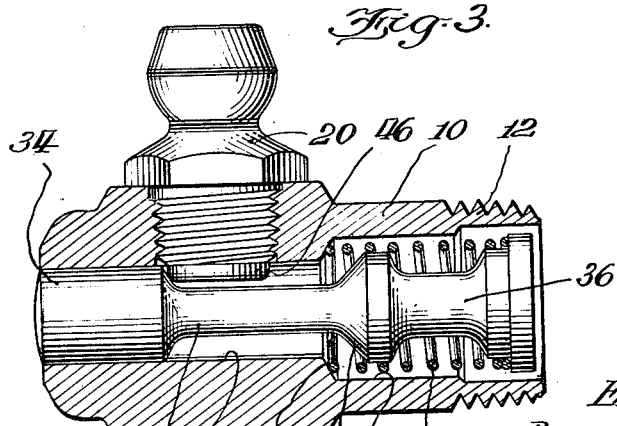
Inventor.
Ernest W. Davis Patented July 13, 1937

2,087,085

UNITED STATES PATENT OFFICE 2,087,085

LUBRICATING APPARATUS

Ernest W. Davis, Oak Park, Ill., assignor to Stewart-Warner Corporation, Chicago, Ill., a corporation of Virginia Application April 8, 1936, Serial No. 73,236

8 Claims. (Cl. 184—105)

My invention relates generally to high pressure lubricating apparatus, and more particularly to improvements in lubricant receiving fittings for use in connection with bearings which are enclosed in a housing.

For example, the bearings on the water pumps of automobiles include a packing which prevents escape of lubricant from the bearing. If, therefore, an excess quantity of lubricant is supplied to such bearings at high pressure, the lubricant pressure may be sufficient to burst the housing of the pump.

It is therefore one of the objects of my invention to provide a lubricant receiving fitting which will prevent the service station operator forcing lubricant into a bearing of this type at dangerously high pressures.

A further object of my invention is to provide an improved lubricant receiving fitting incorporating a valve which will automatically prevent the attainment of higher than a predetermined pressure in the part to which the fitting is connected.

Other objects will appear from the following description, reference being had to the accompanying drawing, in which, Fig. 1 is a fragmentary elevational view of a water pump showing the improved fitting of my invention attached thereto;

Fig. 2 is a central vertical sectional view of the fitting, the nipple of the fitting being shown in elevation; and Fig. 3 is a view similar to Fig. 2 showing a modified form of my invention.

The fitting comprises a body 10 having a threaded shank 12 which is adapted to be screwed into a bearing to be lubricated, as for instance, shown in Fig. 1, wherein the body 10 is screwed into the bearing 11 of a water pump 14 of an automobile. The pump is driven by a pulley 16 on a shaft 18. It is usual to provide a relatively tight packing around the shaft 18 to prevent the escape of water from the pump and the lubricant supplied through the fitting is therefore prevented from escaping to the atmosphere, but instead, if excessive quantities are supplied to the bearing, it may leak into the housing of the pump and build up excessive pressures therein, resulting in cracking the housing.

The body 10 has a lubricant receiving nipple 20 threaded in a side thereof, this fitting being of the usual well-known construction, such, for example, as shown in the patent to Joseph Bystricky No. 2,016,809, granted October 8, 1935. Lubricant under pressure is supplied to the nipple 20 by means of a high pressure gun which is connected to the nipple by means of a coupling or nozzle 22, shown in dotted lines in Fig. 2.

The body 10 has an axial bore 24 to which grease is supplied from the nipple 20, and an enlarged bore 26, communicating with bore 24. The shoulder between the bores 24 and 26 forms a valve seat 28. Within the bores 24 and 26 is located a valve member 30 having an integral stem 32 of reduced diameter and a piston part 34 which has a close sliding fit with the bore 24. A valve 30 has a further stem part 36 which has a head 38 at the end thereof forming a pair of shoulders 40 which serve as a seat for a compression coil spring 42. The spring 42 is under initial compression, and thus normally holds the valve in the position shown in full lines in Fig. 2, with the head 38 in engagement with flange 44 turned inwardly at the end of the shank portion 12. It will be noted that the head 38 has two flat portions so that lubricant may flow past the head through the outlet opening formed by the flange 44.

Upon supplying lubricant under pressure through the coupler 22, the lubricant will flow through the bore 24 into the bore 26 and thence past the head 38 into the bearing part to be lubricated. As long as the resistance to flow into the bearing is not great, the valve 30 will be retained in the position in which it is shown in full lines by the spring 42. When, however, the pressure of the lubricant in the bearing attains a predetermined value above which it is unsafe to raise the pressure, the lubricant pressure, acting over an effective area equivalent to that of the cross-sectional area of the piston portion 34, will force the valve 30 to the left until arrested by the seat 28, as indicated by the dotted line position of Fig. 2. Thereafter, it will be impossible to force any lubricant from the bore 24 past the valve 30, since increased pressure in the bore 24 will act as effectively upon the exposed shoulder of the piston 34 as upon the exposed shoulder of the valve 30. It is merely necessary that the pressure within the bearing be sufficient to overcome the force of the spring 42 and the atmospheric pressure acting upon the piston 34. Possibly because of the fact that just prior to its closure, the valve is subjected to a force resulting from the velocity head of the lubricant flowing into the bearing, the pressure in the bearing is raised slightly above that which would be required merely to hold the valve against its seat. In any event, the valve has been found to be very effective to limit the maximum pressure which can be built up in the bearing.

The construction shown in Fig. 3 is generally similar to that shown in Fig. 2, and similar reference characters have therefore been applied to the corresponding parts. In the construction of Fig. 3, however, the piston 34 is made slightly longer than the piston shown in Fig. 2 so that the inner end of the piston will abut against the projecting end 46 of the nipple 20, thus making it unnecessary to provide a flange 44, as is utilized in Fig. 2 to limit movement of the valve to the right. The operation of the structure shown in Fig. 3 will be identical with that described with reference to the construction of Fig. 2 except that after the lubricant pressure in the bearing drops below the predetermined maximum and the valve 30 is thus permitted to move from its seat, it will be arrested by engagement of the piston 34 with the portion 46 of the nipple instead of being arrested by the flange 44 as utilized in the construction shown in Fig. 2.

While I have shown and described a particular embodiment of my invention, it will be apparent to those skilled in the art that variations may be made in the construction disclosed without departing from the basic features of my invention. I therefore do not wish to be limited to the precise construction disclosed, but wish to include within the scope of my invention all such modifications and variations which will readily suggest themselves.

What I claim as new and desire to secure by United States Letters Patent is:

1. In a high pressure lubricating system, a lubricant receiving device for limiting the lubricant pressure which may be applied to a bearing comprising, a body having a bore extending therethrough, a nipple communicating with said bore, a valve for closing one end of said bore, a piston secured to said valve and slidable in said bore and having one face thereof exposed to atmospheric pressure and its opposite face exposed to the pressure of lubricant supplied through said nipple, the effective areas of said piston and of said valve being substantially equal, and a compression coil spring normally holding said valve in open position.

2. A lubricant receiving fitting for limiting the lubricant pressure which may be applied to a bearing to which the fitting is connected, comprising a body, a cylinder in said body, a valve for closing one end of said cylinder, a spring normally holding said valve open, and a piston having an effective area substantially equal to that of said valve, said piston being rigidly connected to said valve and having one face exposed to the pressure of the lubricant in said cylinder and its opposite face exposed to atmospheric pressure.

3. In a high pressure lubricating system, a lubricant receiving device for limiting the lubricant pressure which may be applied to a bearing comprising, a body having a bore therein, means for transmitting lubricant under pressure to said bore, a valve for closing one end of said bore, a piston having an effective area substantially equal to that of said valve, said piston being secured to said valve and slidable in said bore and having one side thereof exposed to atmospheric pressure and its other side exposed to the pressure of lubricant transmitted through said means, and a compression coil spring normally holding said valve in open position.

4. A lubricant receiving fitting for limiting the lubricant pressure which may be applied to a bearing to which the fitting is connected, comprising a body having a passageway for lubricant, a normally open valve for closing said passageway, a spring to hold said valve open, and means connected to said valve, having an effective area substantially equal to that of said valve, exposed to the pressure of the lubricant in said passageway, and operable to close said valve when the pressure of the lubricant transmitted through said passageway exceeds a predetermined maximum value.

5. In a high pressure lubricating system, a lubricant receiving device for limiting the lubricant pressure which may be applied to a bearing comprising, a body having a bore extending therein, a piston in said bore, a nipple communicating with said bore and having a stop portion projecting thereinto, a valve secured to said piston, said valve being of effective area substantially equal to that of said piston and being arranged for closing one end of said bore, and a compression coil spring normally holding said valve in open position and said piston in engagement with the stop portion of said nipple, whereby upon removal of said nipple, said valve and piston may be removed from said body.

6. A lubricant receiving fitting for limiting the lubricant pressure which may be applied to a bearing to which the fitting is connected, comprising a body, a cylinder in said body, a valve for closing one end of said cylinder, a spring normally holding said valve open, an abutment on said body for limiting opening movement of said valve, and a piston rigidly connected to said valve and having one face exposed to the pressure of the lubricant in said cylinder and its opposite face exposed to atmospheric pressure, the face of said piston exposed to lubricant pressure being of substantially the same effective area as that of said valve.

7. In a high pressure lubricating system, a lubricant receiving device for limiting the lubricant pressure which may be applied to a bearing comprising, a body having a bore therein, means for transmitting lubricant under pressure to said bore, a valve for closing one end of said bore, a piston secured to said valve and slidable in said bore and having one side thereof exposed to atmospheric pressure and its other side exposed to the pressure of lubricant transmitted through said means, and means for holding said valve in open position, the effective areas of said valve and of said piston being substantially equal.

8. A lubricant receiving fitting for limiting the lubricant pressure which may be applied to a bearing to which the fitting is connected, comprising a body having a passageway for lubricant, a normally open valve for closing said passage, yielding means to hold said valve open, and means connected to said valve having a surface exposed to the pressure of the lubricant in said passageway and operable to close said valve when the pressure of the lubricant transmitted through said passageway exceeds a predetermined maximum value, the effective areas of said surface and of said valve being substantially equal.

ERNEST W. DAVIS.